United States Patent [19]

Pipes et al.

[11] Patent Number: 5,277,439
[45] Date of Patent: Jan. 11, 1994

[54] HAND TRUCK

[76] Inventors: George R. Pipes, 3635 Choke Cherry Dr., Salt Lake City, Utah 84109; Glen L. Daley, 9870 Albury Rd., Sandy, Utah 84092

[21] Appl. No.: 842,513

[22] Filed: Feb. 27, 1992

[51] Int. Cl.$^5$ ................................ B62B 1/20
[52] U.S. Cl. .................... 280/47.2; 414/444
[58] Field of Search .......... 280/47.2, 47.21, 47.29; 414/444, 469

[56] References Cited

U.S. PATENT DOCUMENTS 3,873,118  3/1975  Takagi ........................ 280/47.2

FOREIGN PATENT DOCUMENTS

| 125961 | 8/1947 | Australia | 280/47.2 |
| 158528 | 8/1953 | Australia | 280/47.2 |
| 1578137 | 4/1969 | France | 280/47.21 |
| 2043547 | 10/1980 | United Kingdom | 280/47.2 |

Primary Examiner—David M. Mitchell
Assistant Examiner—Andrew C. Pike
Attorney, Agent, or Firm—Terry M. Crellin

[57] ABSTRACT

A hand truck includes a rectangular main frame having a hand grip attached at the upper end of the main frame and a nose attached at the lower end of the main frame. A secondary rectangular frame lies alongside the back side of the main frame, with the secondary frame being pivotally attached at its upper end to the main frame. A pair of primary wheels are attached to the lower end of the secondary frame for rolling the hand truck over a support surface such as the ground or floor. A pair of auxiliary wheels are provided on a swing away frame. The auxiliary wheels can be moved to a position in which the hand truck rests in a stable position on all four wheels. The main frame can then be pivoted about the pivotal connection to the secondary frame to be positioned in a horizontal or near horizontal position elevated from the ground or floor. Heavy objects such as kegs of beer can be rolled directly from a truck, rack or conveyor to the hand truck without requiring the operator to lift the heavy objects.

10 Claims, 9 Drawing Sheets

HAND TRUCK

BACKGROUND OF THE INVENTION

1) Field of the Invention

This invention relates generally to material handling equipment. More particularly, the present invention relates to a hand truck which allows for loading and unloading of objects thereon such as cases of beverage cans, in a manner which substantially eliminates any necessity for the operator to bend over in order to place an object onto the hand truck or to remove an object therefrom.

2) Related Prior Art

Hand trucks for transporting objects have been in use for many years. Such hand trucks are generally comprised of a nose which is fixed in an essentially perpendicular orientation to a support frame, with a set of wheels located at the lower end of the frame close to the nose. The nose is loaded with objects, either by placing objects directly thereon or by sliding the nose underneath the object. The support frame is then grasped by the operator and the wheels are temporarily immobilized while the operator rotates the support frame to lift the nose, and the objects placed thereon, until only the wheels remain on the ground. The hand truck can then be rolled by the operator to transport the objects thereon to a desired location. When it is desired to unload the hand truck the wheels are again immobilized and the nose is lowered until it rests on the ground. The operator may then remove objects directly from the hand truck, or the hand truck may be moved by sliding the nose from beneath the objects.

It has often been desirable for certain types of lifting requirements to modify the standard hand truck to make it more useful to the operator during loading and unloading thereof. Such modifications usually include a nose which is movable along the support frame in such a manner that the nose may be adjusted to a convenient position for either loading or unloading of objects thereon. A hand truck exemplary of this design is shown in U.S. Pat. No. 3,052,323 to Hopfeld which shows a hand truck having a movable nose which is adjustable along the frame by means of a chain and hydraulic pump. Other hand trucks exemplary of this concept are U.S. Pat. No. 3,907,138 Rhodes, U.S. Pat. No. 3,704,799 Morris, Jr. and U.S. Pat. No. 2,598,489 Bayer et al., which show hand trucks which have been modified to allow the nose to adjust along the frame thereof by means of a threaded screw.

In each of the prior art devices, the nose must be positioned by the operator through the operators actuation of the mechanism which moves the nose. This can become very inconvenient when the operator must load and unload a very large number of objects. Since the operator must readjust the location of the nose each time an object is loaded or unloaded from the hand truck, a very large amount of time can be expended in operating a hand truck when a very large number of objects must be loaded and unloaded. An example of this inconvenience can be illustrated in the situation where a delivery person delivering objects such as cases of beverage cans, must quickly load a hand truck with several cases of beverage cans and move them a very short distance into a store and then quickly unload them again. In this instance, a requirement for the operator to readjust the nose location in between loading and/or unloading of each individual case of beverage cans, can easily triple or quadruple the time factor involved in moving the cases of beverage cans into the store.

It is also known in the hand truck art to include an auxiliary set of wheels associated with a swing frame that is pivotally attached to the side of the main frame opposite the nose. The truck may then be set to roll on the pair of wheels located on the main frame alone or in combination with the auxiliary wheels as desired to minimize the amount of work to be expended by the handler.

Generally, the provision of the auxiliary wheels allows the hand truck to be supported on all four wheels with the main frame tilted at an acute angle with the ground or support surface. Objects can be loaded on the hand truck one on top of the other upwardly from the nose, with the objects reclining on the tilted main frame. The loaded hand truck can then be pulled or pushed using all four wheels, or the auxiliary wheels can be disengaged thereby allowing the hand truck to be moved on the two main wheels in a conventional manner.

Prior to the present disclosure, there has been no suggestion of moving the main frame of the hand truck to a horizontal or near horizontal position and of providing means for supporting the main frame in such a position elevated from the floor or support on which the wheels of the hand truck rest. In accordance with the present invention, it has been found highly desirable to provide means for positioning and supporting the main frame in a horizontal or near horizontal position elevated from the ground or floor upon which the wheels of the hand truck rest. Objects can then be moved from a rack, a truck bed or other storage area to the elevated main frame of the hand truck without undue up and down movement of the handler.

With all prior art hand trucks, the operator must bend over many times to load objects such as cases of cans or other items onto a hand truck, and then bend over again several times when unloading the cases. Heavy objects such as kegs of beer which can weigh up to 180 or more pounds are oftedn rolled off a truck, rack or conveyor system and bounced on the ground or floor. The operator must then turn the kegs upright and place one on top of the other on the hand truck. Such bending and lifting, especially when done successively hundreds of times each working day, can have serious effect on the operators health. Muscle strain, back injuries, etc. are very common for operators of this type. Such injuries may be minimized or eliminated by a hand truck in which the main frame can be positioned in a horizontal or near horizontal orientation at an optimum height above the ground or floor so as to alleviate any need for an operator to bend over to load or unload objects therefrom. When placed at an optimum height, very heavy objects such as kegs of beer can be rolled directly from the truck, storage racks, conveyors, etc. on to the hand truck without any lifting by the operator.

Further, in all prior art hand trucks utilizing auxiliary wheels, the mechanism for swinging the auxiliary wheels into and out of their operative position consists of an actuator that extends from one of the longitudinal sides of the hand truck. Such an actuator cannot be engaged by an operator who is standing at the backside of the hand truck in an operative position with his hands on the handle of the hand truck. It has been found that it is highly advantageous to provide an actuator mechanism that can be operated by the toe of the operator as the operator stands in operative position behind the hand truck with his hands on the handle of the hand truck.

SUMMARY OF THE INVENTION

A principal object of the present invention is to provide an improved hand truck of the type having two auxiliary wheels that can be selectively engaged so as to allow the hand truck to set in a stable condition resting on all four wheels wherein the main upstanding frame of the hand truck can be pivoted into a horizontal or near horizontal orientation when the hand truck is being supported on all four wheels.

An additional object of the present invention to provide a hand truck as described above which includes a hand operated mechanism for pivoting the nose end of the main frame of the hand truck into a horizontal or near horizontal position by an operator who is standing behind the hand truck and adjacent to the handle of the hand truck.

It is another object of the present invention to provide a hand truck as described above in which the main frame can be pivoted to be held in either a position which is horizontal or near horizontal or to adjustable positions in which the main frame slants downwardly at no more than 10 degrees from the horizontal.

A still further object of the present invention is to provide a hand truck as described above further comprising toe actuated means for actuating the movement of the auxiliary wheels by an operator standing behind the hand truck in an operative position in which the operator's hands are engaged with the handle of the hand truck.

The above objectives are achieved in accordance with the present invention by providing a novel, unique hand truck having a secondary or support frame which includes a set of first wheels located at the lower end thereof. The main frame of the novel hand truck lies alongside the support frame and includes a pair of rail members to which a nose attached at the lower ends thereof. Novel means are provided for pivoting the main frame relative to the secondary or support frame when the hand truck is supported on all four wheels such that the main frame can be positioned in a horizontal or near horizontal orientation elevated from the ground or floor upon which the wheels of the hand truck rest.

In addition, the present invention provides improved actuator means for moving the swing frame upon which the auxiliary wheels of the hand truck are associated. The improved actuator means allows the operator to move the swing frame from an operative position in which the operator is standing behind the hand truck and adjacent to the handle of the hand truck.

In use, the hand truck is located at the place where objects are to be loaded on the hand truck. The operator actuates the swing frame associated with the auxiliary wheels while the operator is grasping the handle of the hand truck in the operative position behind the hand truck. The auxiliary wheels are thus lowered to the ground or floor and the hand truck is allowed to rest on and be supported by all four wheels, with the main frame and secondary or support frame slanting upwardly from the main set of wheels. The main frame is then pivoted with respect to the upper portion of the secondary or support frame such that the nose on the main frame moves upwardly and the main frame assumes an orientation that is horizontal or near horizontal. In addition, the main frame is elevated from the ground or floor on which the wheels of the hand truck rest.

The operator can now load objects such as cases of beverage cans onto the horizontal positioned main frame of the hand truck at a proper uniform elevation so as to drastically reduce stooping and bending by the operator while loading the hand truck. When it is desired to unload the hand truck, the objects on the hand truck are all on a uniform elevation which again greatly reduces stooping and bending by the operator while unloading the hand truck.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE INVENTION

Preferred embodiments of a hand truck 10 in accordance with the present invention are illustrated in the drawings. The same reference numbers are used for similar elements throughout the following discussion and in the drawings.

In one embodiment as illustrated ia drawings 1–5 of the drawings, the hand truck 10 comprises an elongate, substantially rectangular main frame 12 having a front side, back side, upper end and lower end. A hand grip 14 is attached at the upper end of the main frame 12. A nose 16 is attached at the lower end of the main frame 12.

The main frame 12 is pivotally attached about a pivot axis 18 to a secondary, elongate, substantially rectangular, support frame 20. The secondary or support frame 20 has a front side, back side, upper end and lower end, and the front side of the secondary frame 20 lies alongside the back side of the main frame 12 when, as shown in FIGS. 4 and 5, the main frame 12 is pivoted into abutting relationship with the support frame 20.

As illustrated, the secondary frame 20 is pivotally attached at its upper end to the main frame 12 about the pivot axis 18, wherein the pivot axis 18 is essentially transverse of the main frame 12 at a position spaced from the upper end of the main frame 12 by no more than about 30% of the longitudinal length of the main frame 12. The secondary frame 20 of the embodiment shown in FIGS. 1-5 is divided into an upper portion and a lower portion that are pivotally attached to each other about a pivot axis 24 that is essentially parallel to the first pivot axis 18. The second pivot axis formed by a cross pin 24 is spaced from the upper end of the secondary frame 20 by no more than about 30% of the longitudinal length of the secondary frame.

A pair of main wheels 26 are attached to the secondary frame 20 near the lower end of the secondary frame for rolling the hand truck 10 over a support surface. Means are provided as will be described fully hereinafter for releasably locking the lower end of the main frame 12 in abutting relationship to the lower end of the secondary frame 20 to thereby maintain the main frame 12 and support frame 20 in an operative side-by-side orientation shown in FIGS. 4 and 5. In the position shown in FIG. 5, the hand truck 10 can be manipulated and transported using the wheels 26 in a manner similar to all prior art hand trucks.

Figure 4:
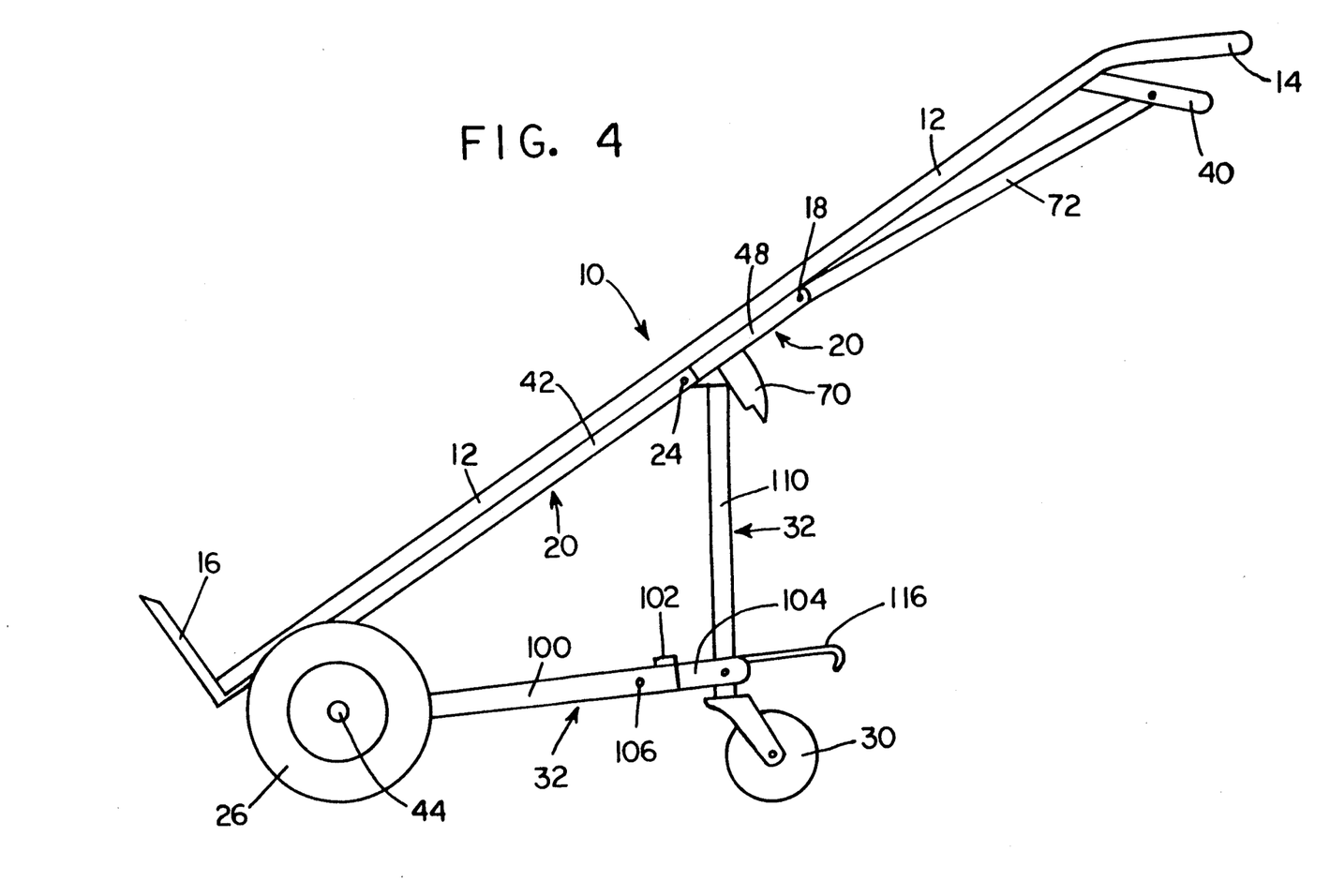
FIG. 4 is a side view of the hand truck similar to that of FIG. 2, but showing the main frame in its position alongside the support frame.
Figures 5, 7:
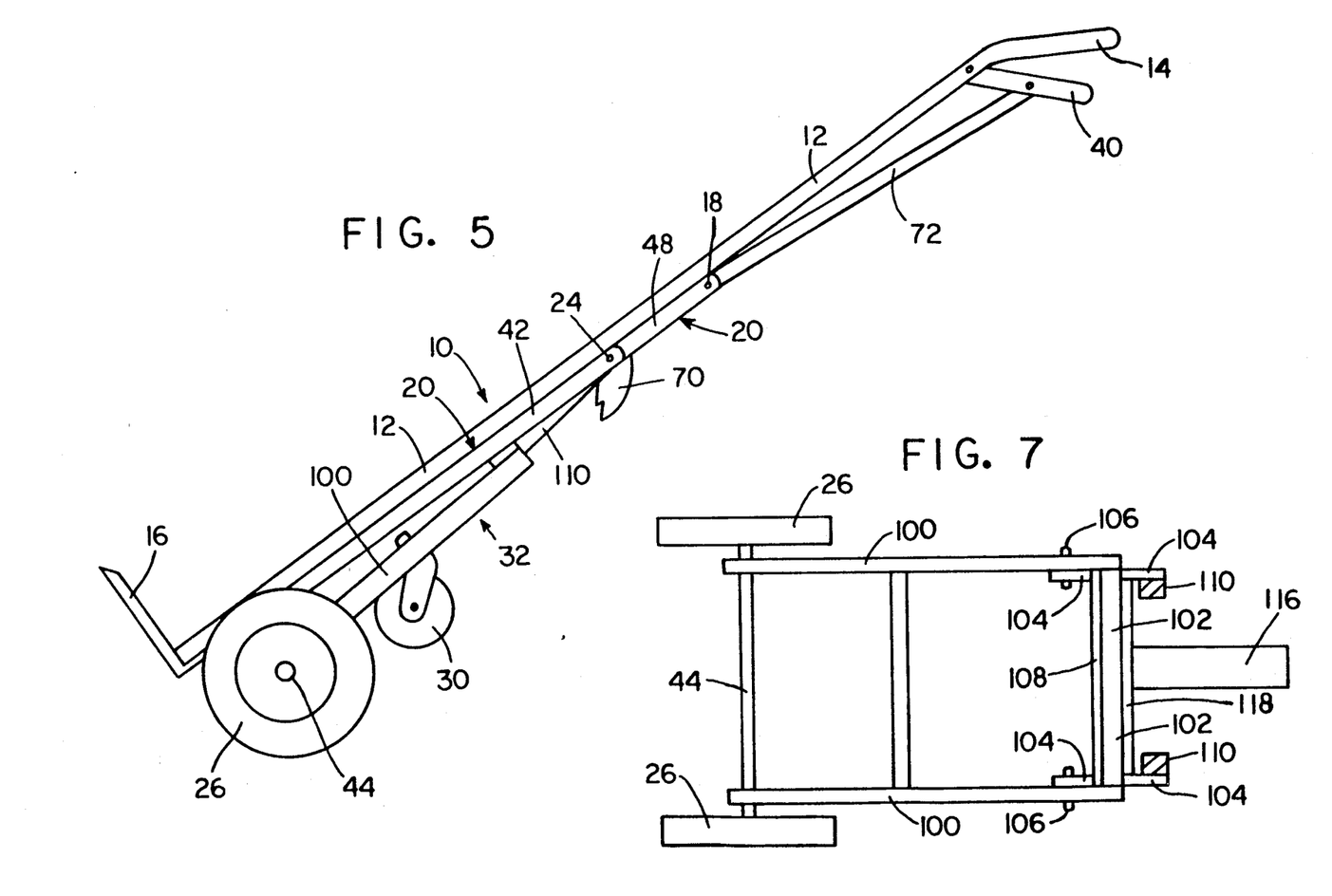
FIG. 5 is a side view of the hand truck similar to that of FIG. 4, but showing the auxiliary wheels folded toward the support frame for conventional movement of the hand truck on the pair of main wheels.
FIG. 7 is a top view of the swing away frame that accommodates the auxiliary wheels of the hand truck.

A pair of second or auxiliary wheels 30 are positioned on a swing away frame 32 such that the auxiliary wheels 30 can be moved between a first operative position as shown in FIG. 5 wherein the auxiliary wheels are located adjacent to the back side of the secondary frame 20 and spaced upwardly from the first wheels 26 and a second operative position as shown in FIG. 4 wherein the second wheels 30 swing upwardly from the first wheels 26 and outwardly from the back of the secondary frame 20. When the swing frame 32 and auxiliary wheels 30 are moved to the position shown in FIG. 4, the hand truck 10 can be supported by all four wheels 26 and 30 on the support surface, with the main frame 12 and the support frame 20 sloping at an acute angle to the support surface.

Means are provided as will be described fully hereinafter for releasing the locking of the lower end of the main frame 12 to the lower end of the secondary frame 20. When the hand truck 10 is supported on all four wheels 26 and 30 and the locking of the lower end of the main frame 12 to the lower end of the support frame 20 has been released, the lower end of the main frame 12 can be pivoted about the second pivot axis formed by the cross pin 24 whereby the nose 16 of the main frame 12 pivots upwardly along with the main frame 12 such that the main frame 12 assumes a substantially horizontal orientation as shown in FIG. 2.

Figure 1:
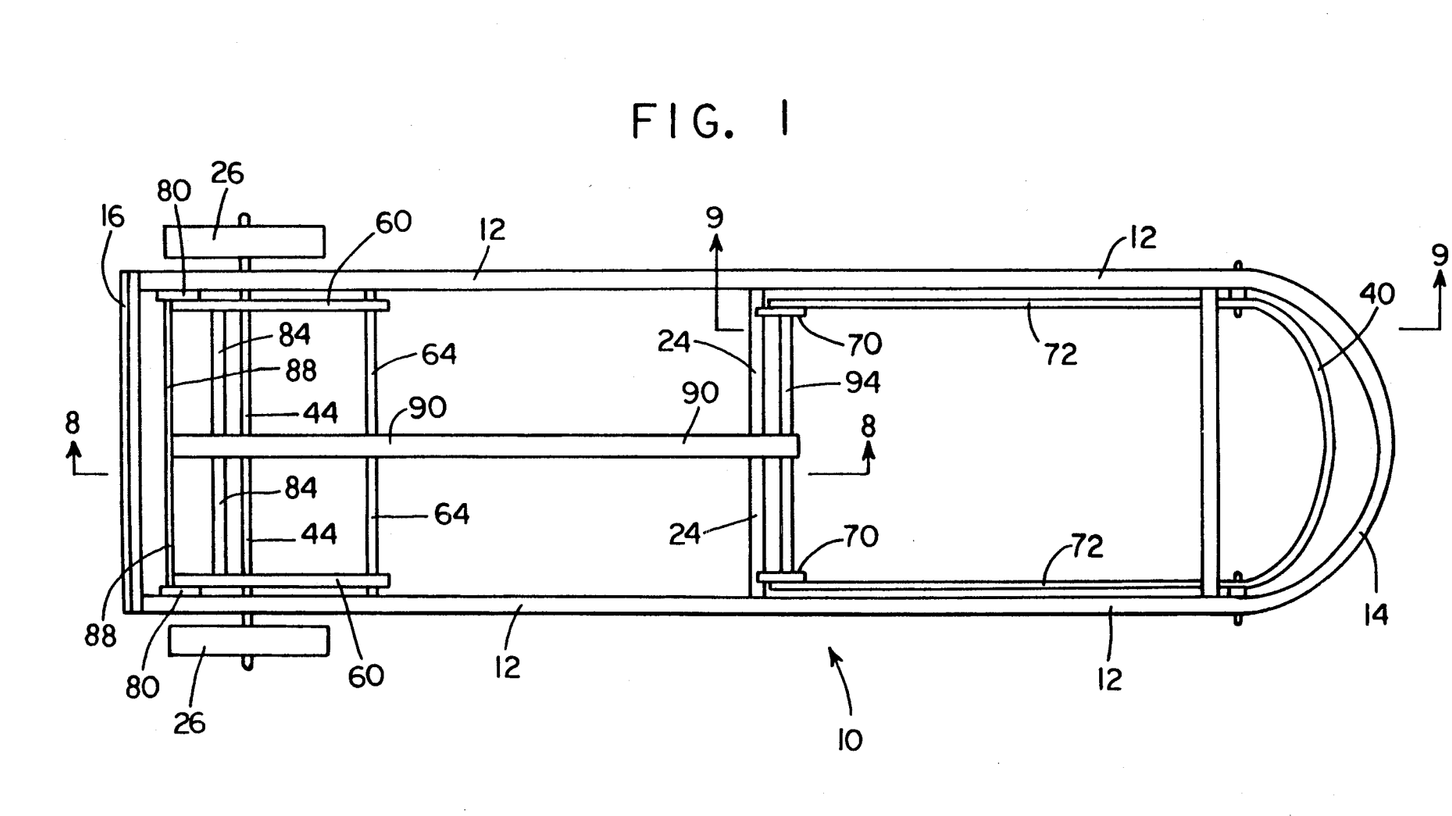
FIG. 1 is a top view of one embodiment of a hand truck made in accordance with the principles of the present invention, with the main frame of the hand truck being shown in its horizontal loading orientation.
Figure 2:
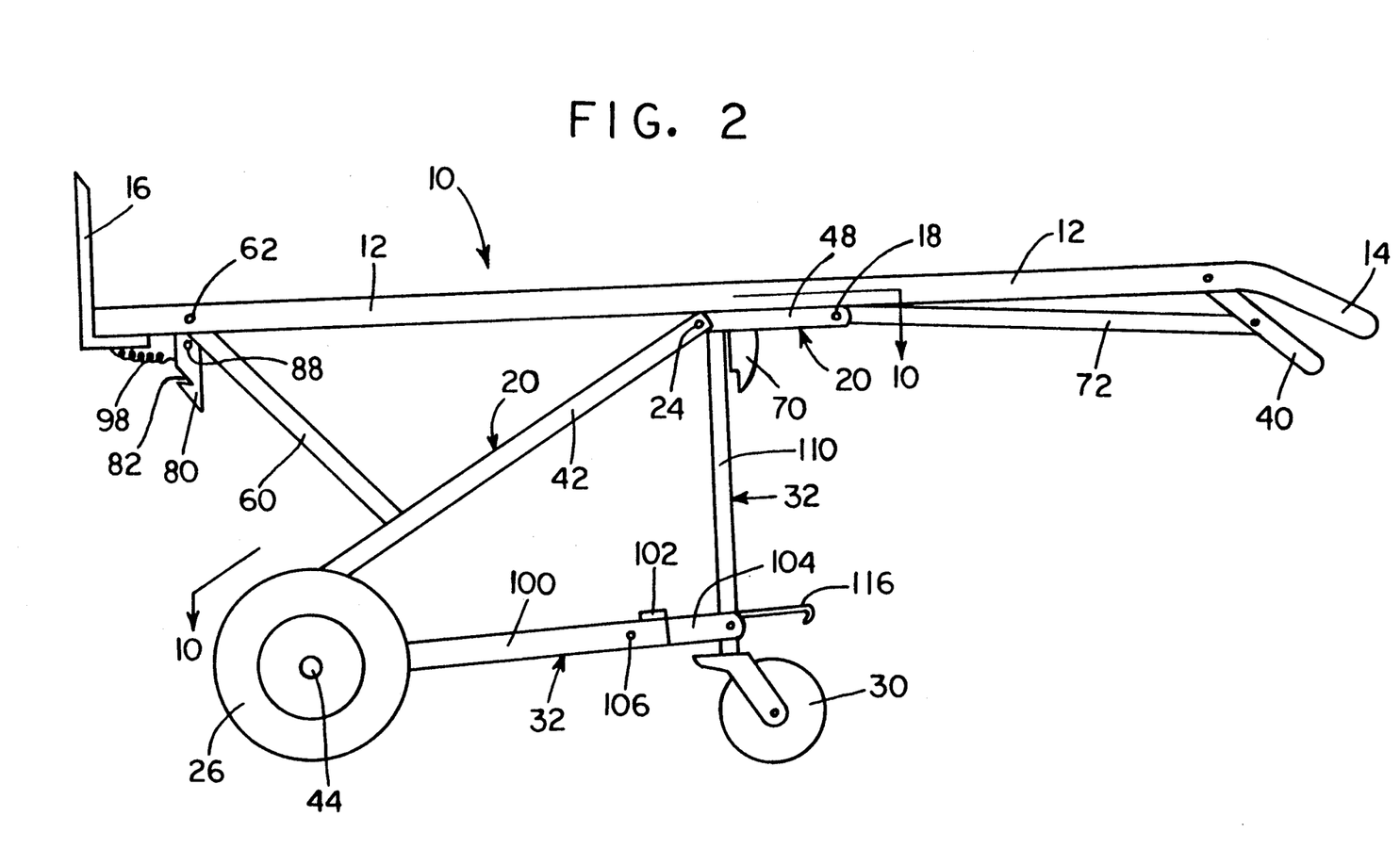
FIG. 2 is a side view of the hand truck shown in FIG. 1.

In FIGS. 1 and 2, the hand truck 10 is shown being supported on all four wheels 26 and 30, with the main frame 12 being pivoted to a horizontal position for loading objects on the main frame 12. The main frame 12 is elevated from the floor or ground upon which the wheels 26 and 30 rest. The elevated position of the main frame 12 allows objects to be placed on or removed from the main frame 12 of the hand truck 10 without repeated stooping and bending by the operator. This greatly minimizes the risk of the operator incurring injury to his back during loading and unloading of objects from the hand truck 10.

In using the hand truck 10 for loading objects and transporting the loaded objects to another location, the objects are placed on the horizontally positioned main frame 12 as explained above. The main frame 12 is then pivoted downwardly to its position adjacent to the support frame 20 as shown in FIG. 4. The hand truck 10 can be moved in this position using all four wheels 26 and 30 rolling on the ground or floor. Using all four wheels is usually satisfactory in instances wherein the hand truck 10 is to be moved only a relatively short distance before being unloaded. Generally, when the hand truck 10 is to be moved any substantial distance, it is preferable to withdraw or disengage the auxiliary wheels 30 and move the hand truck 10 using only the primary wheels 26 in a conventional manner.

To move the hand truck 10 using only its primary wheels 26, the operator grasps the handle 14 and lifts upwardly to pick the auxiliary wheels 30 from the ground or floor. The auxiliary wheels 30 are attached to the swing frame 32, and once the wheels 30 have been lifted from the ground or floor, the swing frame 32 is swung upwardly alongside the underside of the hand truck 10 as shown in FIG. 5. In this position, the auxiliary wheels 30 are withdrawn out of the way and the hand truck 10 can be moved in conventional manner using only the primary wheels 26. A novel toe engaging means for moving the swing frame 32 is provided and will be described fully hereinafter. The novel toe engagement means allows the operator to move the auxiliary wheels 30 between their two extreme positions with the operator's toe as the operator stands at the back of the hand truck 10 grasping the handle 14.

When the loaded hand truck 10 has been moved to the place where the objects are to be unloaded, the operator can move the main frame 12 to a substantially vertical orientation and slide the nose 16 from under the stack of objects as is commonly done with conventional hand trucks. In those instances wherein the objects on the hand truck 10 are to be removed one at a time and placed on a shelf, display or other elevated support, it is advantageous to reverse the steps given above so as to support the hand truck on all four of its wheels 26 and 30, with the main frame 12 in a horizontal position as shown in FIG. 2.

This is done by the operator actuating the toe engagement of the swing frame 32 to lower the auxiliary wheels 30 so that the hand truck 10 can be supported on the primary wheels 26 and the auxiliary wheels 30. The operator then uses a hand operated pull member 40 located adjacent to the handle 14 to release the lower end of the main frame 12 from the support frame 20. The operator then pushes downwardly on the handle 14 to pivot the nose 16 of the main frame 12 upwardly to position the main frame 12 in its horizontal position as shown in FIG. 2. The objects can then be removed from the hand truck 10 one at a time without requiring excessive bending and stooping by the operator.

Figure 10:
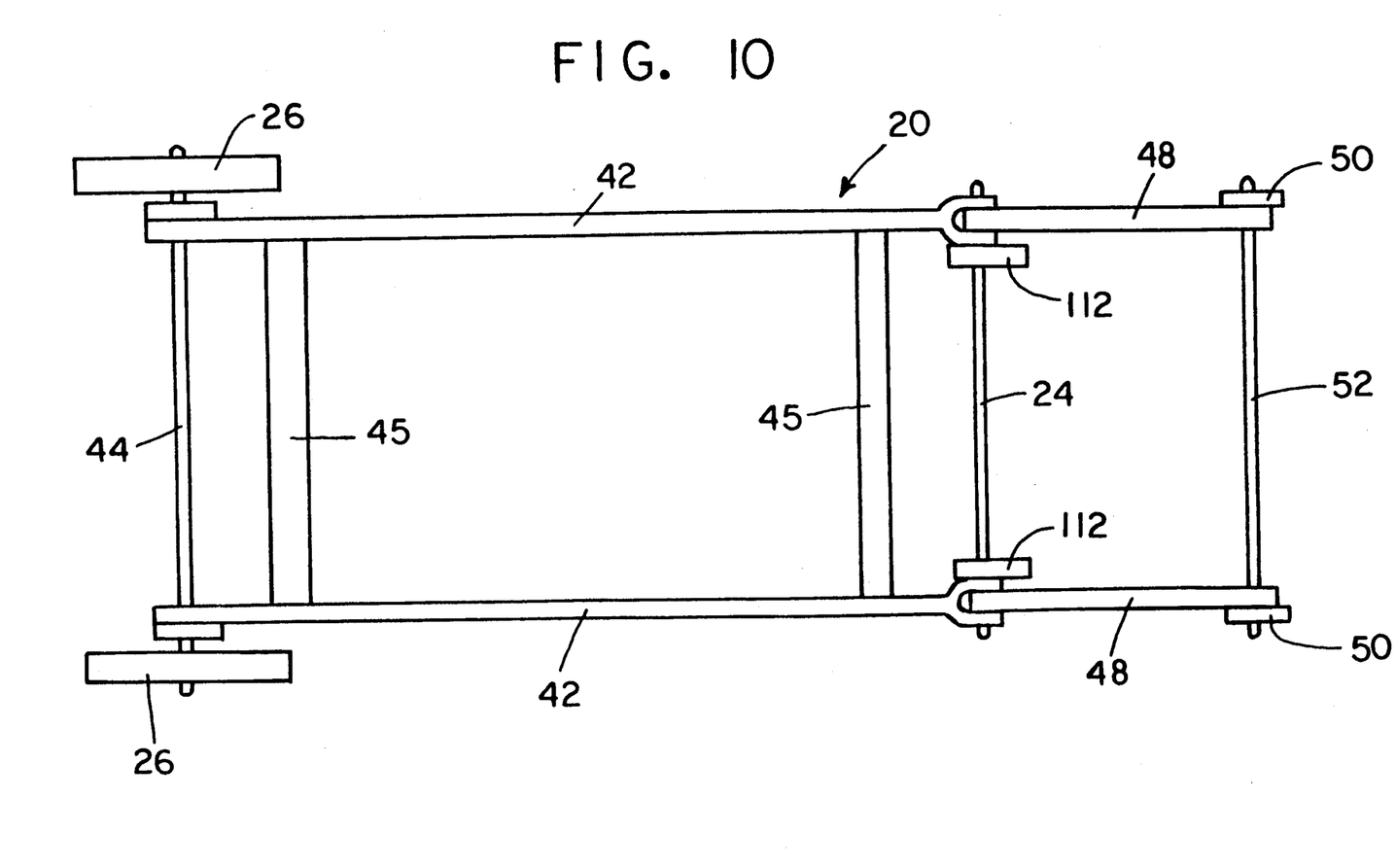
FIG. 10 is a top view of the support frame of the hand truck of FIGS. 1 and 2 taken along line 10—10 of FIG. 2.

In the embodiment of the hand truck 10 shown in FIGS. 1-5, the secondary or support frame 20 is articulated so as to be divided into an upper portion and a lower portion that are pivotally attached to each other. FIG. 10 shows a top view of this articulated support frame 20 in isolation from the other parts of the hand truck. As illustrated in FIG. 10, the support frame 20 comprises a pair of lower rails 42 that are pivotally engaged to an axle 44 which carries the primary wheels 26. Cross members 45 hold the lower rails 42 at proper, parallel, spaced positions.

The upper ends of the lower rails 42 are pivotally connected to the lower ends of upper rails 48. A cross pin 24 forms the axis about which the lower rails 42 and upper rails 48 pivot. The upper ends of the upper rails 48 are in turn pivotally attached to the main frame 12 by brackets 50 that extend downwardly from the main frame 12. A cross pin 52 extends between the brackets 50, and the upper ends of the upper rails 48 pivot about the pin 52. In this embodiment, the main frame 12 pivots about an axis formed by the cross pin 52 when the handle 14 of the main frame 12 is moved downwardly from its positron shown in FIG. 4 to its position shown in FIG. 2. The axis formed by the cross pin 54 coincides with the axis 18 which is referred to previously and shown in FIGS. 2, 3, 4, 5 and 8.

Figure 6:
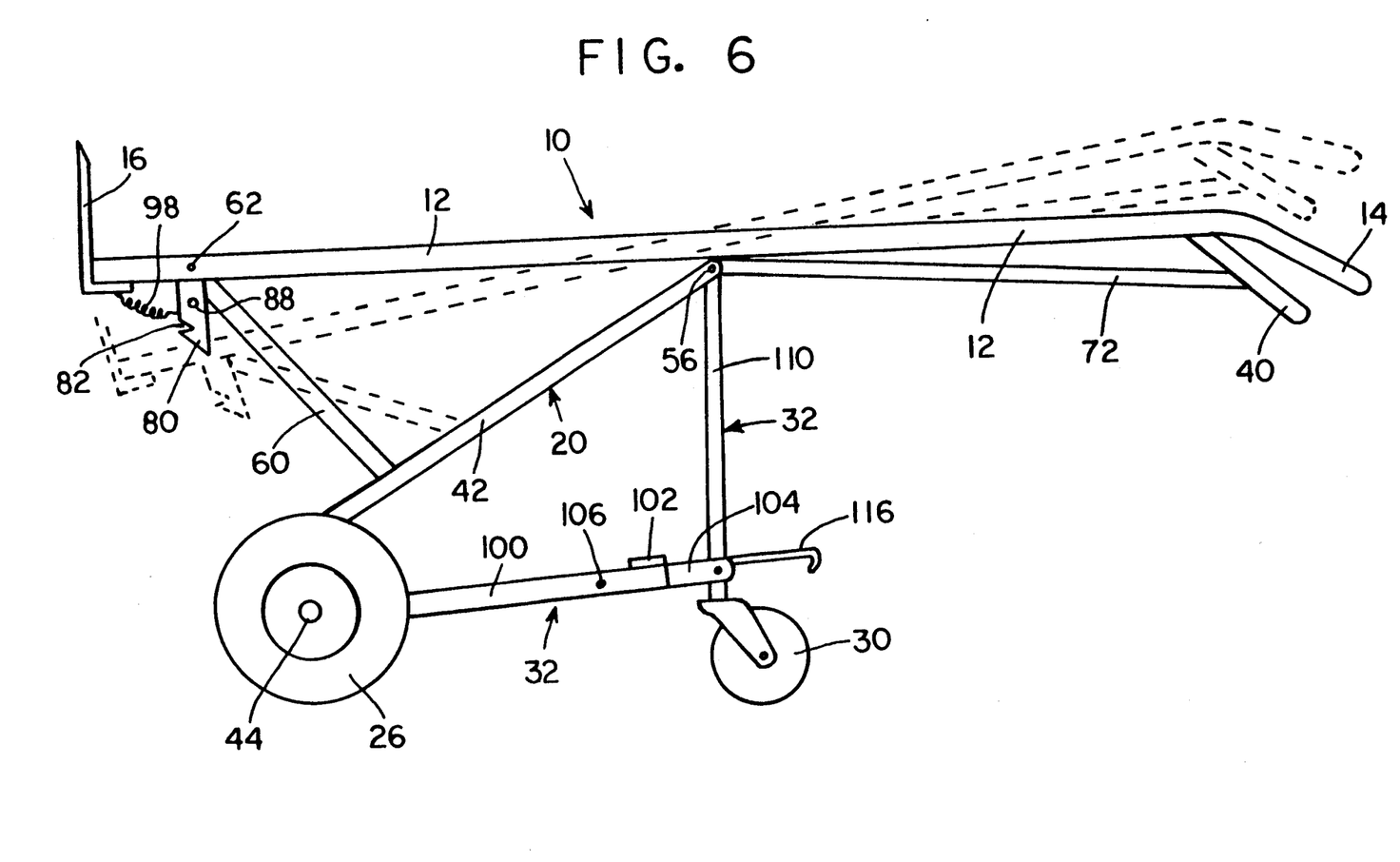
FIG. 6 is a side view of a modified embodiment of a hand truck similar to the hand truck of FIG. 2 but having a support frame that is not articulated as is the support frame of the hand truck of FIG. 2.

In FIG. 6 a modified embodiment of the hand truck 10 of the present invention is shown wherein the secondary frame 20 is not articulated. The secondary frame 20 of the hand truck 10 of FIG. 6 has two opposite side rails 42 that are pivotally connected at respective one ends to the axle 44, with the other ends of the side rails 42 being pivotally connected to the main frame 12 about a pivot axis 56 which corresponds generally to the cross pin 24 of the secondary frame 20 of the hand truck 10 shown in FIGS. 1-5. In the embodiment of the hand truck 10 shown in FIG. 6, the main frame 12 pivots with respect to the support frame 20 about the pivot axis 56 about which the secondary frame 20 is pivotally connected to the main frame 12.

In all the embodiments of the hand truck 10, including the embodiment of FIGS. 1-5 and the embodiment of FIG. 6, it is advantageous to further provide means for releasably locking the main frame 12 in an adjustable near horizontal position. In the near horizontal position, the lower end of the main frame 12 with the nose 16 slants downwardly at an acute angle of up to about 10 degrees from the horizontal when the hand truck is supported on all four wheels 26 and 30.

In the embodiment of the hand truck 10 shown in FIGS. 1-5, the means for releasably locking the main frame 12 in a substantially horizontal orientation and for further releasably locking the main frame 12 in the near horizontal position may utilize common structure, different structure or both. In the embodiment shown in FIG. 6 common structure is used in releasably locking the main frame 12 in both its horizontal and near horizontal positions.

Figures 8, 9:
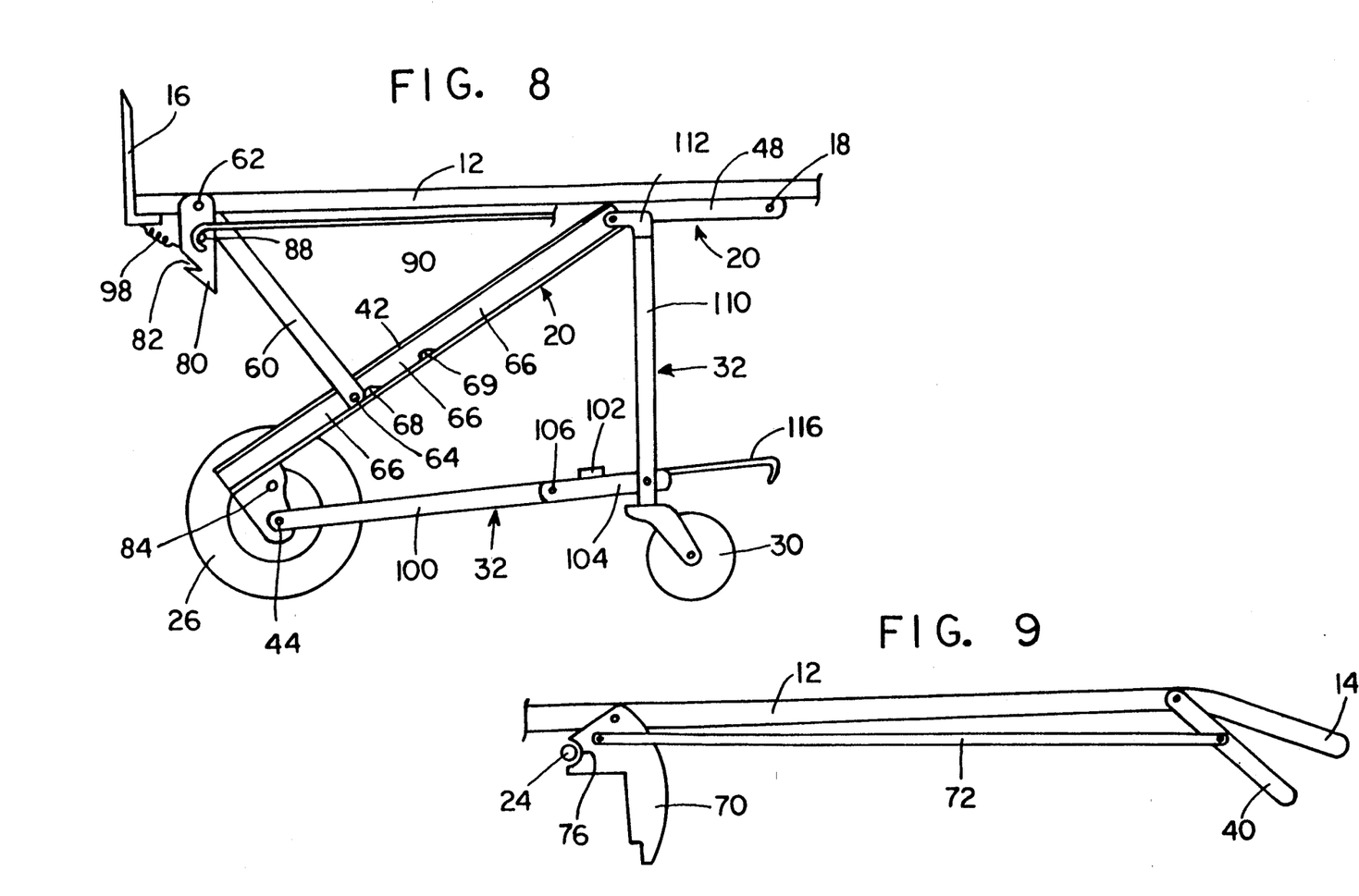
FIG. 8 is and inside side view of the side of the hand truck of FIGS. 1 and 2 taken along line 8—8 of FIG. 1.
FIG. 9 is an inside side view of the upper portion of the hand truck of FIGS. 1 and 2 taken along line 9—9 of FIG. 1.

In both embodiments shown in FIGS. 1-6, the structure used in releasably locking the main frame 12 in a substantially horizontal orientation comprises a pair of swing arms 60 having first and second ends that are pivotally mounted at their respective first ends to the lower end of the main frame 12 for pivotal movement about axis 62 as is best shown in FIG. 8. A cross bar 64 (FIGS. 1 and 8) is attached between the second ends of the swing arms 60, with the cross bar 64 having opposite ends that extend beyond the second ends of the swing arms 60.

An elongate slideway 66 (FIG. 8) is formed along the interior side of each of the lower rails 42 forming the lower portion of the secondary frame. The opposite ends of the cross bar 64 slides back and forth in the respective slideways 66 as the main frame 12 pivots upwardly away from and then backwardly toward the lower portion of the secondary frame 20. Catch means are associated with the slideways 66 for engaging the opposite ends of the cross bar 64 when the main frame 12 is moved to its horizontal position. As the main frame 12 pivots away from the secondary frame 20, the ends of the cross bar 64 slides in the slideways 66 into engagement with the catch means. Means are further provided for releasing the opposite ends of the cross bar 64 from the catch means so that the opposite ends of the cross bar 64 can slide along the slideways 66 away from the catch means to allow the main frame 12 to move back to its position alongside the lower portion of the secondary frame 20.

The catch means preferably comprises abutments 68 in the slideways 66 that the ends of the cross bar 64 slide over and engage. The means as illustrated in the drawings for releasing the opposite ends of the cross bar 64 from the catch means, i.e., the abutments 68, is a lifting member 88 that is actuated by the hand operated pull member 40 to lift the ends of the swing arms 60 and thereby lift the cross bar 64 over the abutments 68 so that the lifted ends of the cross bar 64 can move in a reverse movement over the abutments 68 and back along the slideways 66.

In the embodiment of the hand truck 10 in which the means for releasably locking the main frame 12 in an adjustable slanting position is incorporated into the means for releasably locking the main frame 12 in its horizontal position, a second set of abutments 69 are provided in the slideways 66 for releasably engaging the ends of the cross bar 64 to lock the main frame 12 in a position in which the lower end slants downwardly with an acute angle of up to about 10 degrees between the horizontal and the main frame 12. The slanting position of the main frame 12 is shown by dashed lines in FIG. 6.

Figure 3:
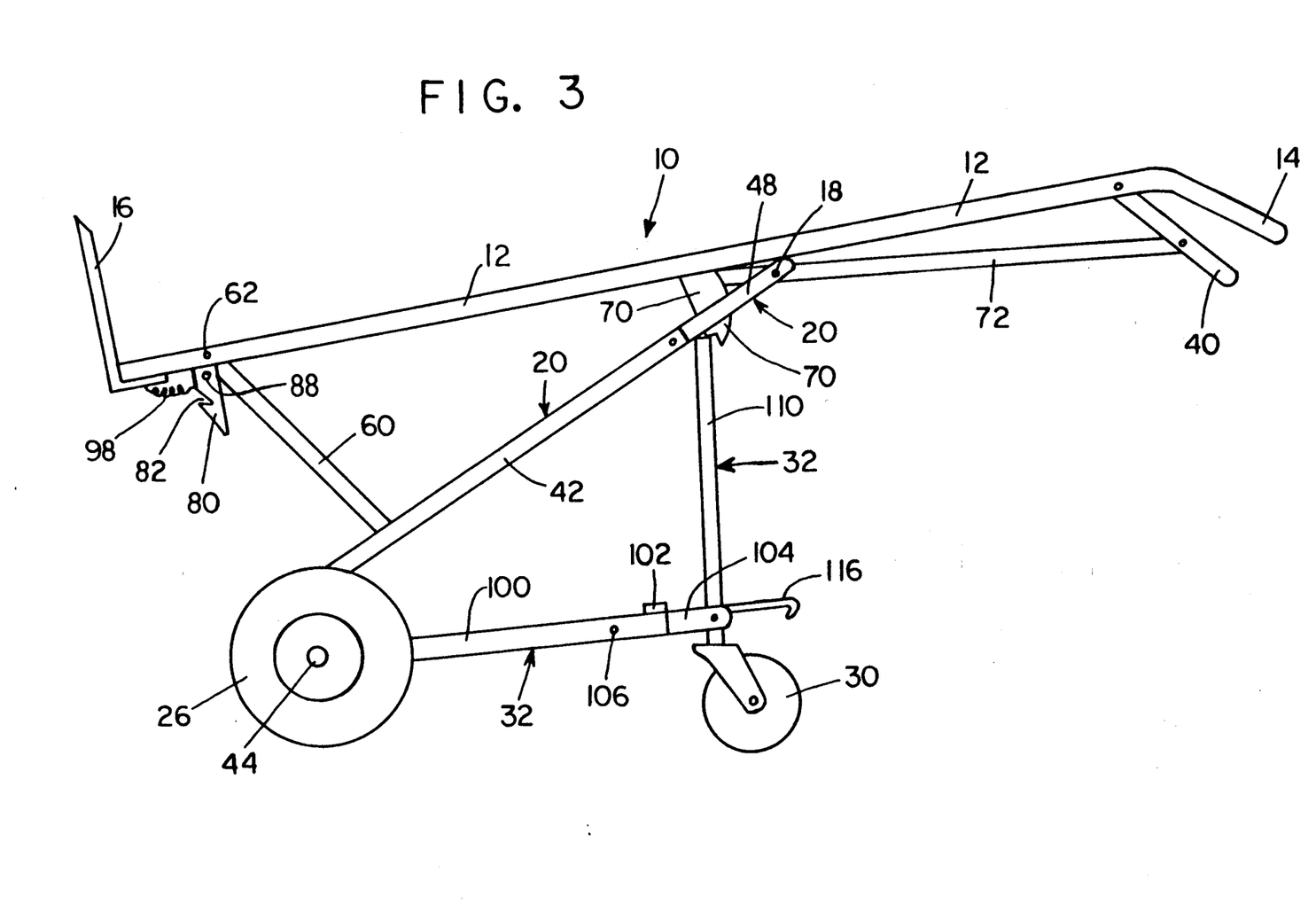
FIG. 3 is a side view of the hand truck of FIG. 2, but showing the main frame in its alternate position for loading in which the main frame slopes slightly downwardly from its handle end.

In the embodiment of the hand truck 10 shown in FIGS. 1-5 that utilizes an articulated secondary frame 20, a separate distinct means can be provided for releasably locking the main frame 12 in an slanting position. This latter means comprises a latch 70 (FIGS. 2,3-5 and 9) that has a keeper notch. The latch 70 is pivotally connected to the main frame 12 and extends downwardly therefrom. The operator end of the main frame 12, i.e., the end having the handle 14, can be raised as shown in FIG. 3 until the keeper notch in the latch 70 engages the top edge of the swing away frame 32 thereby holding the handle end of the main frame 12 elevated slightly from the nose 13 of the main frame 12.

To lower the main frame 12 back to its horizontal position, the pull member 40 near the handle 14 is pulled toward the handle 14. The pull member 40 pulls on elongate rods 72 (an elongate rod 72 and a corresponding latch 70 are positioned on each of the opposite sides of the main frame 12), and the elongate rods 72 are attached to the latch 70 which is in turn pivotally mounted to the main frame 12. When the latch 70 is pulled toward the handle end of the main frame 12 by the pull rods 72, the keeper notch in the latch 70 disengages from the top edge of the swing away frame 32 allowing the main frame 12 to lower backwardly toward the support frame 20. The advantage of this latter means for moving the main frame 12 to a slanting position is that the handle end of the main frame 12 moves upwardly rather than the nose end moving downwardly.

The two latches 70 at opposite sides of the main frame 12 serve another advantageous purpose. A second notch 76 (FIG. 9) is positioned in the latch 70, with the notch 76 being capable of engaging the pivot rod 24 when the main frame 12 and the support frame 20 are in their side-by-side abutting relationship to lock the mid portion of the main frame 12 to the upper portion of the support frame 20. To release the mid portion of the main frame 12 from engagement to the upper portion of the support frame 20, the pull member 40 is pulled toward the handle 40 so as to pivot the latch 70 to disengage the notch 76 from the rod 24.

As was mention previously, means are provided for releasing the locking of the lower end of the main frame 12 to the lower end of the secondary frame 20 when the hand truck is supported on all four wheels 26 and 30. These means comprises a releasable catch member 80 mounted one each on each of the opposite sides of the main frame 12 near the lower end thereof. A keeper member 84 (FIGS. 1 and 8) on the secondary frame 22 is releasably engaged by the catch member 80. As illustrated in the drawings, the catch member 80 is pivotally mounted to the lower end of the main frame 12 about a pivot axis 62 which also serves as the pivot axis for the swing arm 60 as described previously. The catch member 80 extends below the main frame 12 and has a keeper notch 82 which will engage an elongate keeper member 84 (FIGS. 1 and 8) that extends between the opposite sides of the main frame 12.

To release the catch member 80 so that the lower end of the main frame 12 can pivot away from the lower end of the secondary frame 20, means are provided for pivoting the catch member 80 out of engagement with the keeper member 84. As illustrated, a cross member 88 extends between the two spaced catch members 80, with the cross member being offset downwardly from the pivot axis 62 of the catch members 80. A pull bar 90 (FIGS. 1 and 8) extends generally parallel with the opposite sides of the main frame 12 towards the upper end of the main frame 12. The upper extending end of the pull bar 90 is attached to a cross member 94 extending between the latches 70 on each side of the main frame 12.

As the pull member 40 is pulled toward the handle 14, the rods 72 withdraw the latches 70 which in turn pull back the cross member 94. When the cross member 94 is pulled toward the top end of the main frame 12, the pull bar 90 moves the cross member 88 toward the top end of the main frame 12. This movement of the cross member 88 pivots the catch members 80 so that the keeper notches 82 in the catch members 80 disengage from the keeper member 84.

A pair of springs 98 are attached between the respective catch members 80 and the end of the main frame 12. The springs 98 bias the entire release system away from the handle 14 when the operator releases the pull member 40.

It should be noted that the means for lifting the swing arms 60 and the cross bar 64 in releasing the locking of the main frame 12 in its horizontal orientation is the cross member 88 that extends between the two spaced catch members 80. As the cross member 88 is drawn toward the top end of the main frame 12 by pulling the pull member 40, the cross member 88 engages the swing arms 60 and lifts their fee ends and the cross bar 64 upwardly to disengage from the abutments 68 in the slideways 66 on the sides of the main frame 12.

In the preferred embodiments of the invention as illustrated, the hand truck 10 is provided with a novel, improved swing away frame 32 for supporting the auxiliary wheels 30, wherein the swing away frame 32 can be moved between its two extreme operating positions by an operator of the hand truck 10 as the operator stands at the back of the hand truck 10 with his hands engaging the handle 14 of the hand truck 10. The improved swing away frame comprises a pair of elongate struts 100 having first and second ends. The respective first ends of the struts 100 are pivotally attached to the axle 44 of the secondary frame 20 adjacent to the lower end of the secondary frame 20.

A brace 102 having opposite ends attached to respective free ends of the struts 100 extends transversely between the free ends of the struts 100. A pair of elongate secondary struts 104 having first and second ends are pivotally attached at their first ends to respective second ends of the struts 100 about a pivot axis 106. A cross member 108 is attached at its opposite ends to respective secondary struts 104.

The second ends of the pair of secondary struts 104 are pivotally attached to a substantially rectangular swinging support frame. The second ends of the secondary struts 104 are attached to the opposite sides of the second or lower end of the swinging support frame. Auxiliary wheels 30 are pivotally attached to the end of a substantially rectangular swinging support frame. The first end of the swinging support frame is pivotally attached to the secondary frame, and the pair of auxiliary wheels 30 are attached to the second end of the swinging support frame. As illustrate, the swinging support frame comprises two substantially parallel struts 110 that are attached to a L-shaped connector 112 which is in turn pivotally connected to the rod forming the pivot axis 24 between the upper and lower portions of the secondary frame 20.

A toe engageable actuator member 116 extends essentially perpendicular from the cross member 108 that connects the secondary struts 104. The actuator member 116 can be engaged by the toe of an operator of the hand truck 10 when the operator is grasping the handle 14 of the hand truck 10. When the swing frame 32 is in a working position in which the auxiliary wheels 30 are lowered to engage the ground or floor as shown in FIG. 4, the actuator member 116 extends substantially horizontally away from the swing frame 32 toward the handle end of the hand truck 10.

An operator uses his toe to engage the actuator member 116 and move it downwardly to collapse the swing away frame 32 to its retracted position shown in FIG. 5. In the retracted position, the actuator member 116 extends downwardly toward the main wheels 26. To move the swing frame back to its working position, the operator uses his toe to engage the actuator member 116 and pull the actuator member back toward the operator as the operator is positioned at the handle end of the hand truck 10.

Figure 11:
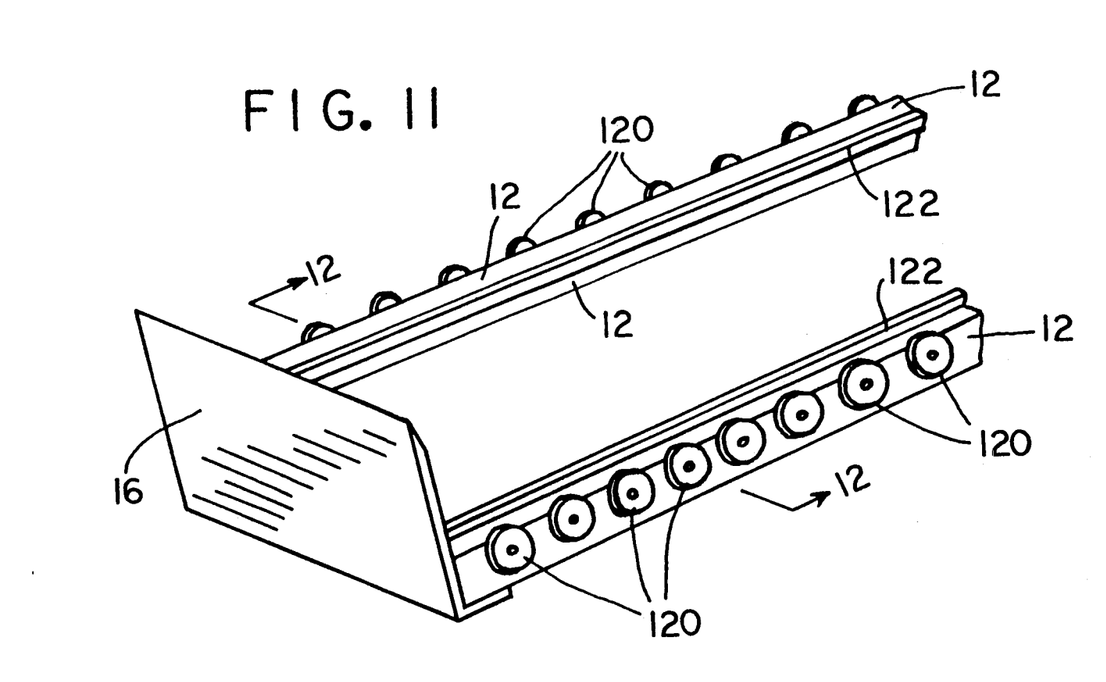
FIG. 11 is a pictorial view of the side rails of the main frame of a hand truck similar to the hand truck of FIGS. 1 and 2 but which include slide members positioned along the sides of the side rails.
Figure 12:
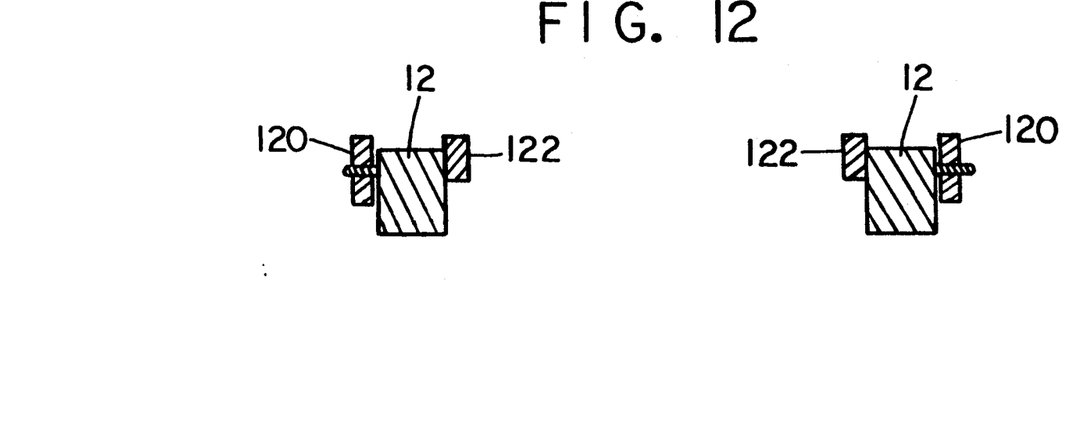
FIG. 12 is a cross section of the side rails of FIG. 11 taken along line 12—12 of FIG. 11.

As shown in FIGS. 11 and 12, roller and/or sliding means can be provided along the side edges of the opposite sides of the main frame 12. As illustrated, a series of rollers 120 can be provided on either the inside or outside edges of the sides of the main frame 12. The upper sides of the rollers 120 extend slightly above the upper surface of the main frame 12 and allow objects loaded on the main frame 12 to easily slide along the main frame 12 when the main frame 12 is in its horizontal or near horizontal position.

As shown in FIGS. 11 and 12, the rollers 120 are provided on the outside of the opposite side members of the main frame 12, and an elongate piece of plastic material 122 is provided along the inside of the side members of the main frame 12. The rollers or a n anti-friction slide surface could just as well be formed on the top or upper surface of the side members. As illustrated, elongate plastic pieces 122 extend slightly above the upper surface of the main frame 12 and again allow objects placed on the main frame 12 when the main frame 12 is in its horizontal or near horizontal position to slide freely along the plastic pieces 122. Generally, the hand truck 10 will include either the rollers 120 or the plastic pieces 122, although both can be provided as shown in FIGS. 11 and 12 if so desired.

It is to be understood that the above described embodiment of the present invention is only illustrative of the application of the principles thereof. Numerous modifications and alternative embodiments or arrangements may be devised by those skilled in the art without departing from the spirit and scope of the present invention and the appended claims are intended to cover such modifications and arrangements.

We claim:
1. A hand truck comprising
an elongate, substantially rectangular main frame having a front side, back side, upper end and lower end;
a hand grip attached at the upper end of said main frame;
a nose attached at the lower end of said main frame;
a secondary, elongate, substantially rectangular frame having a front side, a back side, upper end and lower end, with the front side of said secondary frame lying alongside the back side of the main frame, said secondary frame being pivotally attached at its upper end to said main frame about a pivot axis that is essentially transverse of the main frame at a position spaced from the upper end of said main frame by no more than about 45% of the longitudinal length of said main frame;
means for releasably locking the lower end of said main frame in abutting attachment to the lower end of said secondary frame, comprising a releasable catch member mounted on said main frame and a keeper on said secondary frame that is releasable engaged by said catch member;
a pair of first wheels attached to said secondary frame near the lower end of said secondary frame for rolling the hand truck over a support surface;
a pair of second wheels positioned on a swing away frame such that the second wheels can be moved between a first operative position in which the second wheels are located adjacent the back side of said secondary frame and spaced upwardly from said first wheels and a second operative position in which the second wheels swing upwardly from said first wheels and outwardly from the back side of said secondary frame, whereby the hand truck can be supported by all four wheels on the support surface, with the main frame of the hand truck sloping at an acute angle to the support surface;
means for releasing the locking of the lower end of said main frame to the lower end of said secondary frame when said hand truck is supported on all four wheels;
means for pivoting said main frame about said pivot axis so that when said hand truck is supported on all four wheels and when the lower end of the main frame has been released from its locked engagement to said secondary frame, the main frame can be pivoted upwardly; and
means for releasably locking the main frame in a substantially horizontal orientation when the main frame has been pivoted to the horizontal orientation.

2. A hand truck in accordance with claim 1 wherein means are further provided for releasably locking the main frame in a position in which the lower end thereof slants downwardly with an acute angle of up to about 10 degrees between the horizontal and the main frame when the hand truck is supported on all four wheels.

3. A hand truck in accordance with claim 1 wherein the means for releasing the locking of the lower end of said main frame to the lower end of said secondary frame comprises
a hand operated pull member that when operated pulls the releasable catch member on said main frame to release the catch member from the keeper on said secondary frame.

4. A hand truck in accordance with claim 3 wherein the means for releasably locking the main frame in the substantially horizontal orientation when the main frame has been pivoted to the horizontal orientation comprises
a pair of swing arms having first and second ends;
means for pivotally mounting the first ends of the respective swing arms to the lower end of said main frame;
a cross bar attached between the second ends of said swing arms, with the cross bar having opposite ends that extend beyond the second ends of the swing arms;
a pair of elongate slideways on opposite sides of said secondary frame, with the opposite ends of said cross bar sliding back and forth in the respective slideways as the main frame pivots upwardly away from said secondary frame;
catch means associated with said slideways for engaging the opposite ends of said cross bar when the main frame is moved to its horizontal orientation and as the ends of said cross bar slides in the slideways into engagement with said catch means; and
means for releasing the opposite ends of said cross bar from said catch means so that the opposite ends of said cross bar can slide along said slideways away from said catch means to allow the main frame to move back to its position alongside said secondary frame.

5. A hand truck in accordance with claim 4 wherein
the catch means comprises abutments in the slideways that the ends of said cross bar slide over and engage; and
the means for releasing the opposite ends of said cross bar from said catch means is a lifting member that is actuated by a hand operated actuator member, whereby the lifting member lifts the ends of said cross bar over said abutments so that the lifted ends can move in a reverse movement over the abutments and back along said slideways.

6. A hand truck in accordance with claim 5 wherein a second set of abutments is provided in the slideways for releasably engaging the ends of said cross bar to lock the main frame in a position in which the lower end slants downwardly with an acute angle of up to about 10 degrees between the horizontal and the main frame, and further wherein said lifting member can also be actuated to lift the ends of said cross bar over said second set of abutments so that the lifted ends can move over the second set of abutments and back along said slideways.

7. A hand truck in accordance with claim 1 wherein the means for releasably locking the main frame in the substantially horizontal orientation when the main frame has been pivoted to the horizontal orientation comprises
a pair of swing arms having first and second ends;
means for pivotally mounting the first ends of the respective swing arms to the lower end of said main frame;
a cross bar attached between the second ends of said swing arms, with the cross bar having opposite ends that extend beyond the second ends of the swing arms;
a pair of elongate slideways on opposite sides of said secondary frame, with the opposite ends of said cross bar sliding back and forth in the respective slideways as the main frame pivots upwardly away from said secondary frame;
catch means associated with said slideways for engaging the opposite ends of said cross bar when the main frame is moved to its horizontal orientation and as the ends of said cross bar slides in the slideways into engagement with said catch means; and
means for releasing the opposite ends of said cross bar from said catch means so that the opposite ends of said cross bar can slide along said slideways away from said catch means to allow the main frame to move back to its position alongside said secondary frame.

8. A hand truck in accordance with claim 7 wherein the catch means comprises abutments in the slideways that the ends of said cross bar slide over and engage; and
the means for releasing the opposite ends of said cross bar from said catch means is a lifting member that is actuated by a hand operated actuator member, whereby the lifting member lifts the ends of said cross bar over said abutments so that the lifted ends can move in a reverse movement over the abutments and back along said slideways.

9. A hand truck in accordance with claim 8 wherein a second set of abutments is provided in the slideways for releasably engaging the ends of said cross bar to lock the main frame in a position in which the lower end slants downwardly with an acute angle of up to about 10 degrees between the horizontal and the main frame, and further wherein said lifting member can also be actuated to lift the ends of said cross bar over said second set of abutments so that the lifted ends can move over the second set of abutments and back along said slideways.

10. A hand truck comprising
an elongate, substantially rectangular main frame having a front side, back side, upper end and lower end;
a hand grip attached at the upper end of said main frame;
a nose attached at the lower end of said main frame;
a secondary, elongate, substantially rectangular frame having a front side, back side, upper end and lower end, with the front side of said secondary frame lying alongside the back side of the main frame, said secondary frame being pivotally attached at its upper end to said main frame about a pivot axis that is essentially transverse of the main frame at a position spaced from the upper end of said main frame by no more than about 45% of the longitudinal length of said main frame;
means for releasably locking the lower end of said main frame in abutting attachment to the lower end of said secondary frame;
a pair of first wheels attached to said secondary frame near the lower end of said secondary frame for rolling the hand truck over a support surface;
a pair of second wheels positioned on a swing away frame such that the second wheels can be moved between a first operative position in which the second wheels are located adjacent the back side of said secondary frame and spaced upwardly from said first wheels and a second operative position in which the second wheels swing upwardly from said first wheels and outwardly form the back side of said secondary frame, whereby the hand truck can be supported by all four wheels on the support surface, with the main frame of hand truck sloping at an acute angle to the support surface;
means for releasing the locking of the lower end of said main frame to the lower end of said secondary frame when said hand truck is supported on all four wheels;
means for pivoting said main frame about said pivot axis so that when said hand truck is supported on all four wheels and when the lower end of the main frame has been released from its locked engagement to said secondary frame, the main frame can be pivoted upwardly;
means for releasably locking the main frame in a substantially horizontal orientation when the main frame has been pivoted to the horizontal orientation; and
said swing away frame comprises
a pair of first elongate struts having first and second ends, with respective first ends of said first elongate struts being pivotally attached to the secondary frame adjacent to the lower end of said secondary frame;
a brace having opposite ends attached to respective free ends of said struts to extend transversely between the free ends of said struts;
a pair of elongate secondary struts having first and second ends, with the first ends of said secondary struts being pivotally attached to said first elongate struts at the respective second ends of said first elongate struts;
a cross member having opposite ends attached to respective elongate secondary struts;
a substantially rectangular swing frame having first and second ends, with the first end of said swing frame being pivotally attached to the secondary frame and with said pair of second wheels being attached to the second end of said swing frame;
said second ends of said pair of secondary struts being pivotally attached to said swing frame at opposite sides of the second end of said swing frame; and
a toe engageable actuator member extending essentially perpendicular from said cross member that connects said secondary struts, whereby the actuator can be engaged by the toe of an operator of the hand truck when the operator is grasping the hand grip of the hand truck.

* * * * *